United States Patent
Kuo

(10) Patent No.: US 10,436,300 B2
(45) Date of Patent: Oct. 8, 2019

(54) OFFSET PRELOAD BALL SCREW WITH EXPANDABLE LOADING AREA

(71) Applicant: HIWIN TECHNOLOGIES CORP., Taichung (TW)

(72) Inventor: Chang-Hsin Kuo, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 324 days.

(21) Appl. No.: 15/441,970

(22) Filed: Feb. 24, 2017

(65) Prior Publication Data

US 2017/0167584 A1 Jun. 15, 2017

Related U.S. Application Data

(63) Continuation-in-part of application No. 14/468,535, filed on Aug. 26, 2014, now abandoned.

(51) Int. Cl.
 *F16H 25/22* (2006.01)

(52) U.S. Cl.
 CPC . *F16H 25/2209* (2013.01); *F16H 2025/2242* (2013.01)

(58) Field of Classification Search
 CPC .................................................. F16H 25/2209
 See application file for complete search history.

(56) References Cited

U.S. PATENT DOCUMENTS

| | | | | |
|---|---|---|---|---|
| 2,936,645 A | * | 5/1960 | Morris | F16H 25/2209 74/409 |
| 3,258,983 A | * | 7/1966 | Valenti | F16H 25/2209 74/409 |
| 4,221,137 A | * | 9/1980 | Futaba | B62D 3/08 74/216.3 |
| 2004/0182190 A1 | * | 9/2004 | Murakami | B62D 5/0448 74/424.81 |
| 2008/0295630 A1 | * | 12/2008 | Chen | F16H 25/2209 74/424.87 |

FOREIGN PATENT DOCUMENTS

| | | |
|---|---|---|
| DE | 69203789 T2 | 12/1995 |
| EP | 1471286 A1 | 10/2004 |
| JP | 05340460 A | 12/1993 |
| JP | 2006-250282 A | 9/2006 |
| TW | I312395 B | 7/2009 |

* cited by examiner

*Primary Examiner* — Terence Boes
(74) *Attorney, Agent, or Firm* — Wang Law Firm, Inc.

(57) ABSTRACT

An offset preload ball screw with expandable loading area includes: a screw, a nut, and a plurality of balls between the screw and the nut. The inner helical groove of the nut includes at least a first section, a second section and a third section which are continuously connected one another. The preload constantly and smoothly changes in the second section, and the balls can be subjected to loads in positive or negative direction in the second section. Therefore, the running smoothness, precision and load capacity of the ball screw of the present invention is enhanced.

9 Claims, 5 Drawing Sheets

OFFSET PRELOAD BALL SCREW WITH EXPANDABLE LOADING AREA

This application is a continuation in part of U.S. patent application Ser. No. 14/468,535 which claims the benefit of the earlier filing date of Aug. 26, 2014.

BACKGROUND OF THE INVENTION

Field of the Invention

The present invention relates to a linear transmission device, and more particularly to an offset preload ball screw with expandable loading area.

Description of the Prior Art

Ball screw is a reliable, quiet and high precision linear transmission device, and is normally applied with a preload in order to ensure high precision of positioning.

As shown in FIG. 1, a conventional offset preload ball screw 10 comprises a screw 11 and a nut 12 mounted on the screw 11. The screw 11 includes a screw helical groove 111, the nut 12 includes a nut helical groove 121, and a plurality of balls 13 is disposed between the screw and nut helical grooves 111, 121. As shown in FIG. 3, which shows the relationship between the axial coordinates and the helical angle coordinates of the nut helical groove 121, wherein the preload is applied in such a manner that an offset point P is provided on the nut helical groove 121, the horizontal axis represents the helical angle coordinates of the nut helical groove 121, and the longitudinal axis represents the axial coordinates of the nut helical groove 121. At the left side of the offset point P, the helical angle coordinates of the nut helical groove 121 is directly proportional to the axial coordinates of the nut helical groove 121, the amount of increase in the axial coordinates for each additional 360 degrees (namely one revolution of the nut 12) of the helical angle coordinates is defined as a lead value L. At the right side of the offset point P, the helical angle coordinates of the nut helical groove 121 is also directly proportional to the axial coordinates of the nut helical groove 121, namely, the lead value L. However, at the offset point P, the nut helical groove 121 produces a lead offset value δ, which will cause axial coordinates of the nut helical groove 121 offset, and therefore the balls 13 at two sides of the offset point P will produce preloads in opposite directions. The lower part of FIG. 1 shows the preload change, wherein the horizontal axis represents the axial coordinates, and the longitudinal axis represents the preload applied to the balls 13 in the axial coordinate direction. The negative and positive signs indicate the direction of the preload, and the lower part of FIG. 1 clearly shows that the direction of the preload applied to the balls 13 of the ball screw 10 changes sharply at the offset point P. At the left side of the offset point P, the value of the preload applied to the ball screw 10 is positive, and the value of the preload of the ball screw 10 at the right side of the offset point P becomes negative all of a sudden. The slope of the preload is infinite, and the differential of the curve at this point can also be defined as infinite. The sharp change in preload would cause instable and unsmooth running of the ball screw 10. FIG. 2 shows another ball screw 10. The preload change of the balls 13 is shown in the lower part of FIG. 2, where the slope of the preload at the offset point P is also infinite, therefore the ball screw 10 as shown in FIG. 2 suffers the same disadvantages of the ball screw as shown in FIG. 1.

As shown in FIGS. 4 and 5, another ball screw 20 also comprises a screw 21, a nut 22, and a plurality of balls 23 disposed in a circulation path between the screw 21 and the nut 22. The circulation path includes a loading section A, a non-loading section B, and a loading section C. The loading sections A and C at both sides of the non-loading section B are subjected to preloads in opposite directions, and the arrangement of the non-loading section B releases the preloads applied to the area between the loading sections A and C. By such arrangements, the problem that the preload applied to the ball screw changes sharply from positive value to negative value at such a rate that the slope is infinite can be prevented. However, the lower part of FIG. 5 shows the preload change, wherein the horizontal axis represents the axial coordinates, and the longitudinal axis represents the preload applied to the balls 23 in the axial coordinate direction. The negative and positive signs indicate the direction of the preload, and the lower part of FIG. 5 clearly shows that the direction of the preload applied to the balls 23 of the ball screw 20 still changes sharply at the two end point of the non-loading section B, namely, the preload applied to the balls in the non-loading section B will be reduced sharply to 0. Therefore, the ball screw 20 will still encounter sharp preload change, which consequently will cause noise and vibration when the ball screw 20 is running. Furthermore, the balls 23 in the non-loading section B cannot be subjected to the loading between the screw 21 and the nut 22, and therefore does not offer any help to the load capacity of the ball screw 10.

The present invention has arisen to mitigate and/or obviate the afore-described disadvantages.

SUMMARY OF THE INVENTION

The primary objective of the present invention is to provide an offset preload ball screw with expandable loading area which is free of the problem that the conventional ball screw that the offset lead would cause unsmooth running of the ball screw. Besides, the design of expandable loading area would improve the load capacity of the ball screw.

To achieve the above objective, an offset preload ball screw with expandable loading area in accordance with the present invention comprises: a screw, a nut and a plurality of balls disposed between the screw and the nut.

The screw has a length extending along an axis and including an outer helical groove formed on an outer surface thereof, and a cross-section profile of the outer helical groove of the screw is designed in a Gothic shape with two arcs, the outer helical groove has a screw lead value. A radius of the arcs of the Gothic shape is defined as a first radius.

The nut has a length extending along the axis and includes an inner helical groove, wherein a cross-section profile of the inner helical groove is designed in a Gothic shape too. The nut is sleeved onto the screw, and between the outer and inner helical grooves is defined a loading path. The inner helical groove includes at least a first section, a second section and a third section which are continuously connected one another. The amount of displacement along the X axis for each additional 360 degrees of a helical angle of the first section is equal to a first lead value, the amount of displacement along the X axis for each additional 360 degrees of a helical angle of the second section is equal to a second lead value, and the amount of displacement along the X axis for each additional 360 degrees of a helical angle of the third section is equal to a third lead value, the first and third lead values, being equal to the screw lead value. And, the first lead value does not equal to the second lead values.

A plurality of balls is disposed in the loading path, wherein a radius of the respective balls is defined as a second radius, and the first radius is larger than 1.01 times the second radius.

The preload constantly and smoothly changes in the second section, and the balls can be subjected to loads in positive or negative direction in the second section. Therefore, the running smoothness, precision and load capacity of the ball screw of the present invention is enhanced.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
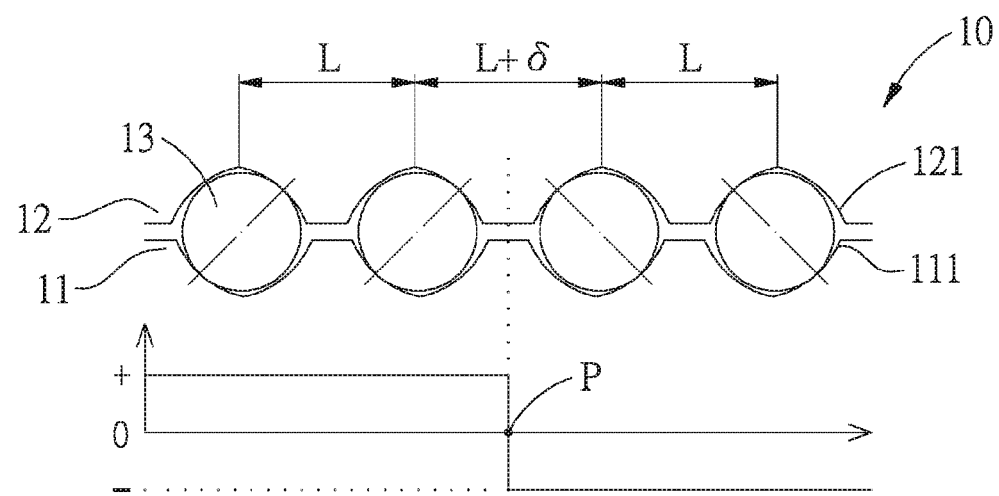
FIG. 1 is a cross sectional view showing a conventional ball screw, and the preload change of the ball screw.
Figure 2:
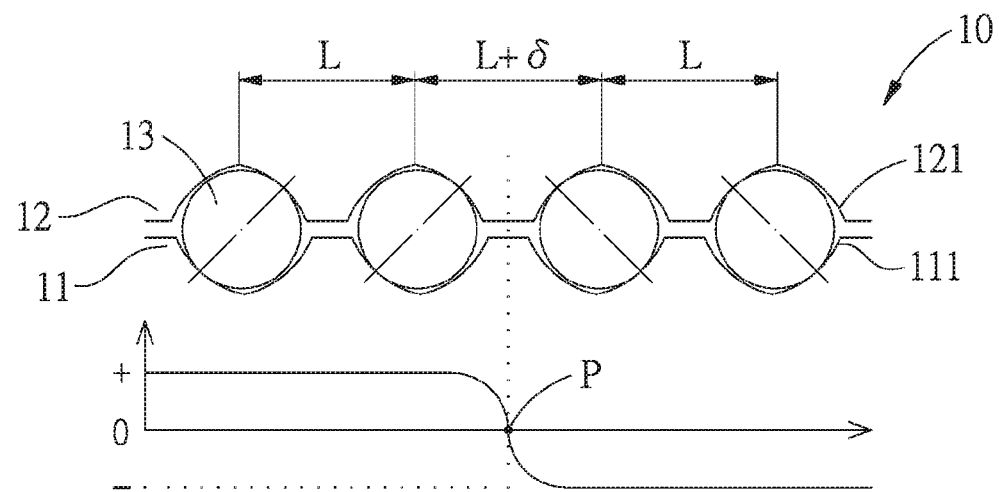
FIG. 2 is a cross sectional view showing another conventional ball screw, and the preload change of the ball screw.
Figure 3:
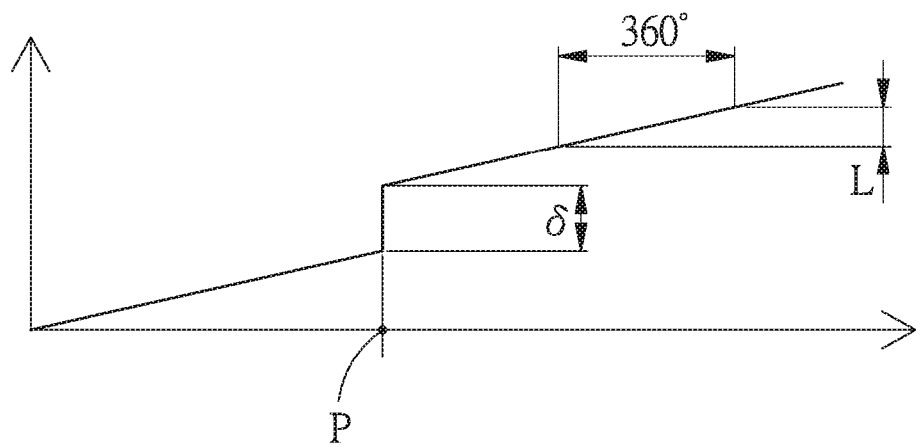
FIG. 3 shows the relationship between the axial coordinates and the helical angle coordinates of the helical groove of the conventional ball screw.
Figure 4:
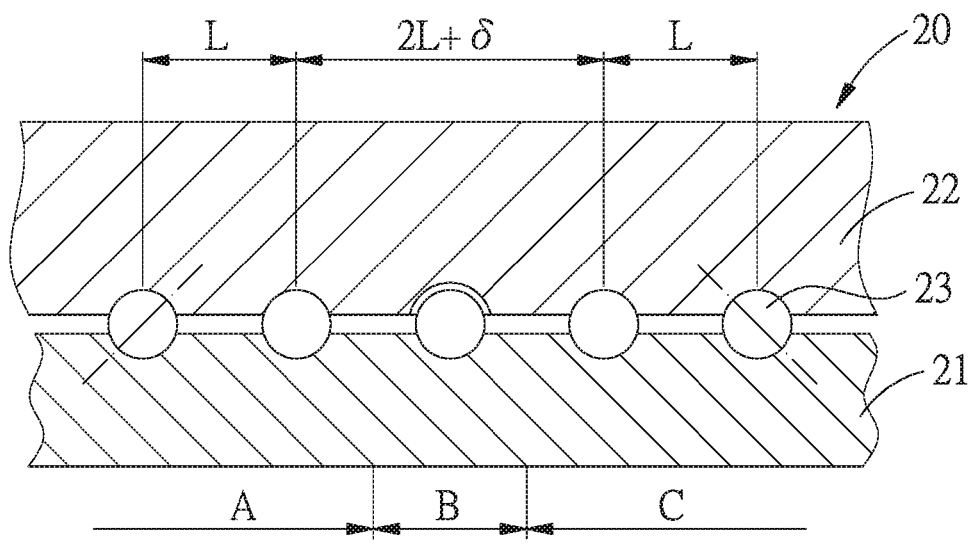
FIG. 4 is a cross sectional view of another ball screw with a non-loading section.
Figure 5:
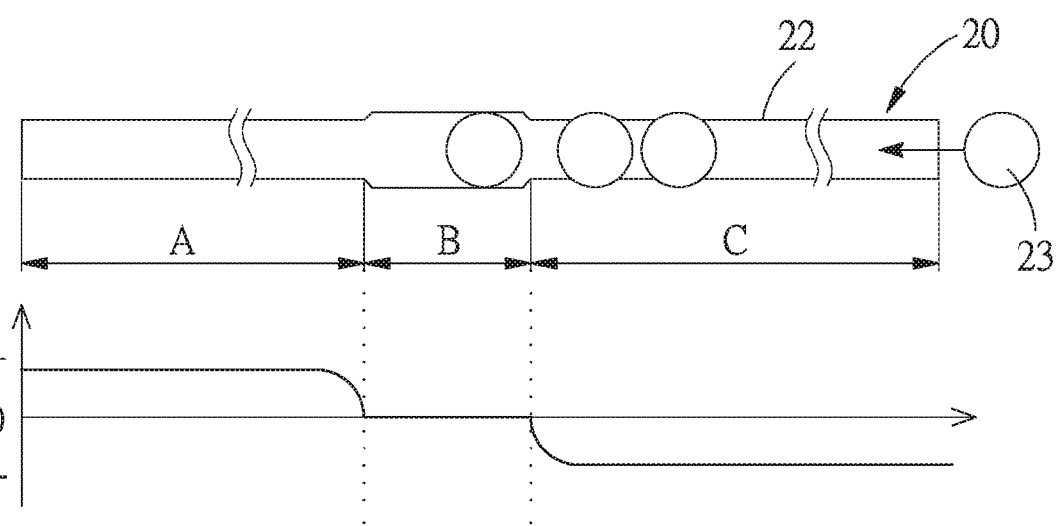
FIG. 5 is a side view of FIG. 4 and a preload change.
Figure 6A:
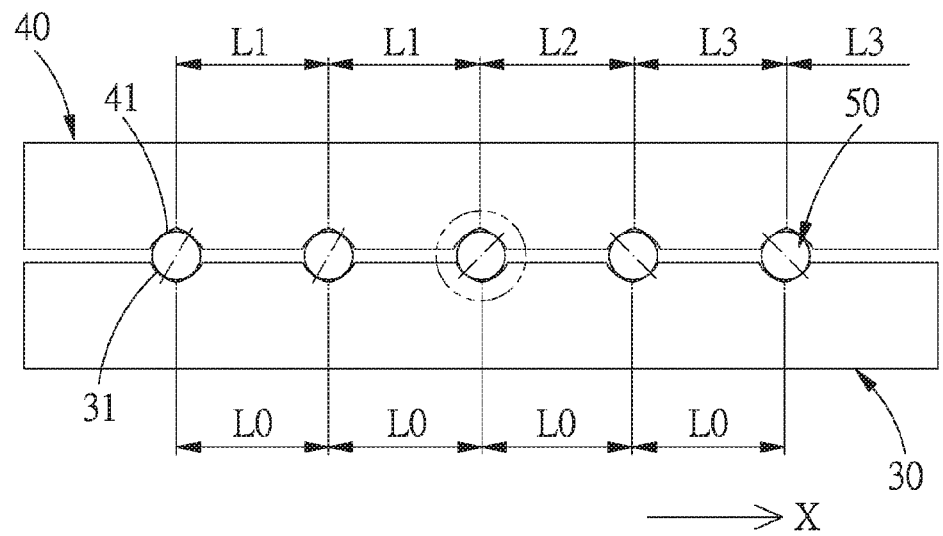
FIG. 6A is an illustrative view of an offset preload ball screw with expandable loading area in accordance with a preferred embodiment of the present invention.

Referring to FIGS. 6-7, an offset preload ball screw with expandable loading area in accordance with a preferred embodiment of the present invention comprises: a screw 30, a nut 40, and a plurality of balls 50 between the screw 30 and the nut 40.

The screw 30 has a length extending along an X axis and includes an outer helical groove 31 on an outer surface thereof. The helical groove 31 is designed in a Gothic shape, and the Gothic shape refers to a shape formed by two arcs which have the same radius and are eccentric to each other. The outer helical groove 31 of the screw 30 has a stable and constant screw lead value L0, namely, the amount of displacement along the X axis for each additional 360 degrees (one revolution) of the helical angle of the outer helical groove 31 is equal to the screw lead value L0. A radius of the arcs of the Gothic shape of the outer helical groove 31 is defined as a first radius R1.

The nut 40 has a length extending along the X axis and includes an inner helical groove 41 formed on an inner surface of the nut 40. The nut 40 is designed in a Gothic shape too and sleeved onto the screw 30, and the outer and inner helical grooves 31, 41 define a loading path therebetween. The inner helical groove 41 includes at least a first section 411, a second section 412 and a third section 413 which are connected one another sequentially. The amount of displacement along the X axis for each additional 360 degrees (one revolution) of the helical angle of the first section 411 is a first lead value L1, the amount of displacement along the X axis for each additional 360 degrees (one revolution) of the helical angle of the second section 412 is a second lead value L2, and the amount of displacement along the X axis for each additional 360 degrees (one revolution) of the helical angle of the third section 413 is a third lead value L3. The first and third lead values L1, L3 are equal to the screw lead value L0.

Figure 6B:
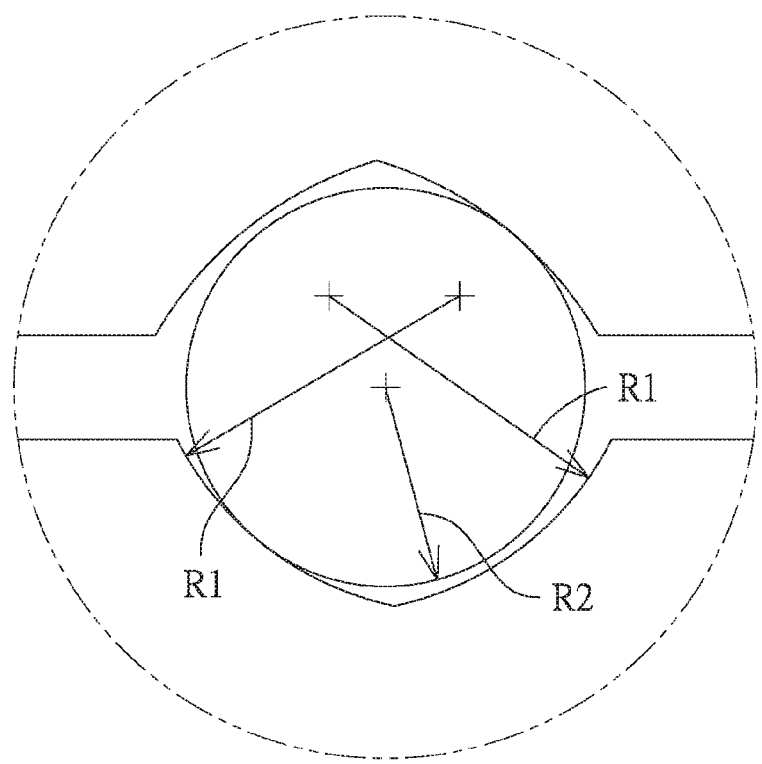
FIG. 6B is a magnified view of a part of the offset preload ball screw with expandable loading area in accordance with the present invention.
Figure 7A:
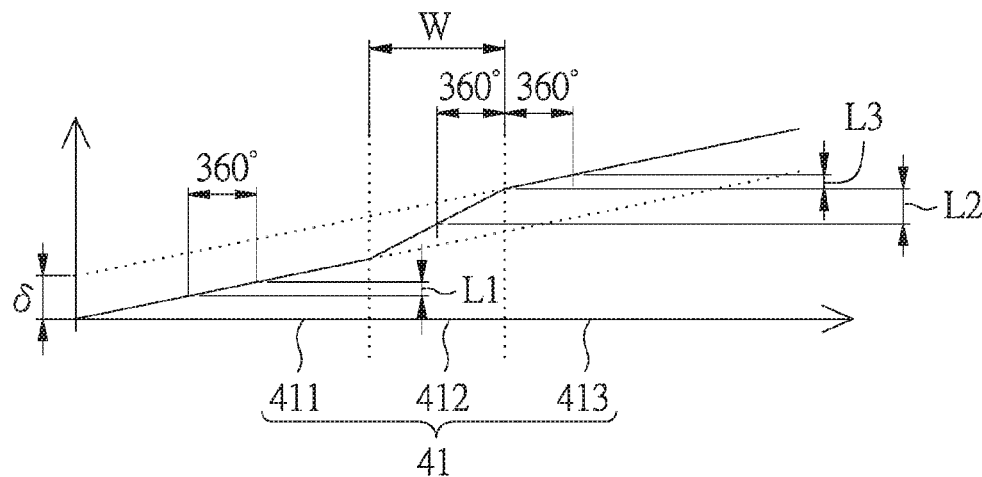
FIG. 7A shows the relationship between the helical angle and the axial coordinates of the offset preload ball screw with expandable loading area in accordance with the present invention.

Referring then to FIG. 7A, the horizontal axis represents the helical angle coordinates, and the longitudinal axis represents the X axis coordinates. The slope of the second section 412 is obviously different from those of the first and third sections 411, 413. Therefore, there is an axial offset value between the extension lines of the first and third sections 411, 413 along the X axis, and the axial offset value is defined as a lead offset value δ which is not equal to zero. δ is equal to the value of W(L2−L1)/L2, under the condition that the first and third lead values L1, L are equal, wherein W is the length of the second section 412 along the X axis, and the first and second lead values L1, L2 are not equal. In FIG. 6, the length W of the second section is approximately equal to the second lead value L2, and it should be noted that FIG. 6 is illustrative only, the length W of the second section is not limited to being equal to one time the second lead value L2 and can be 0.5-2 times (preferably one time) the second lead value L2. FIG. 7A is also only illustrative, in actual application, the difference between the first and second lead values L1, L2 is very small, and the lead offset value δ is far smaller than the first lead value L1, normally, smaller than or equal to one percent of the first lead value L1 to make the change of load applied to the balls 50 smooth (FIG. 7A purposely enlarged the lead offset value δ in order to more clearly show the first, second and third sections 411, 412, 413).

Figure 7B:
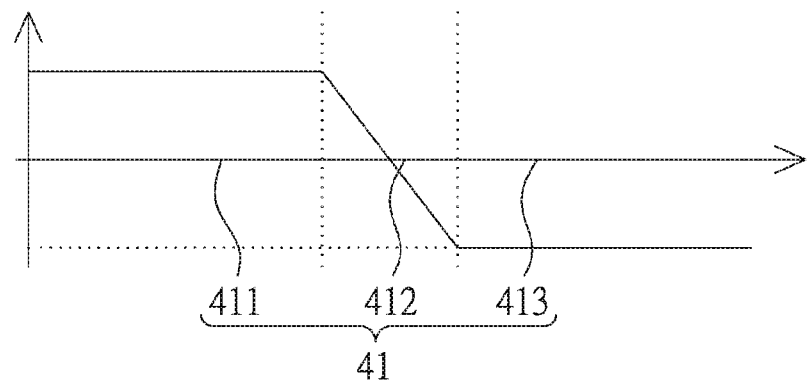
FIG. 7B shows the relationship between the helical angle and the offset value of the offset preload ball screw with expandable loading area in accordance with the present invention.

The balls 50 are disposed in the loading path. By the lead offset value δ between the first and third sections 411, 413, the balls 50 in the first and third sections 411, 413 will be subjected to the offset values in opposite directions. As shown in FIG. 7B, the horizontal axis represents the helical angle coordinates of the inner helical groove 41, and the longitudinal axis represents the offset value for inner helical groove 41. The offset value in the second section 412 is an inclined straight line, namely, it continuously changes. In other words, the change rate for offset value in the second section 412 is relatively stable and constant. A radius of the respective balls 50 is defined as a second radius R2, and the first radius R1 is larger than 1.01 times the second radius R2.

Figure 7C:
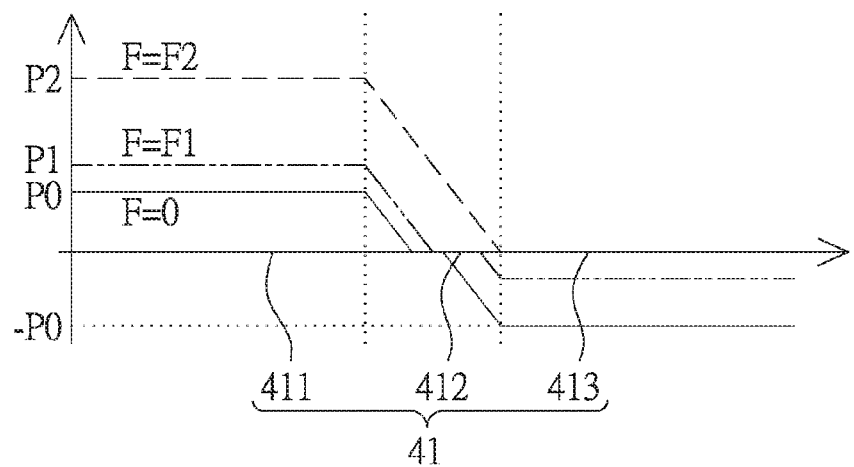
FIG. 7C shows the relationship between the helical angle and load applied to the offset preload ball screw with expandable loading area in accordance with the present invention.

Referring then to FIG. 7C, the horizontal axis represents the helical angle coordinates of the inner helical groove 41, and the longitudinal axis represents the load applied to the balls 50 in axial coordinate direction at that location. The solid line in FIG. 7C represents the load (which is called preload) applied to the balls 50 when the nut 40 is not subjected to external load. There is a constant offset value in the first section 411, therefore the value of the preload applied to the balls 50 in the first section 411 is constant and defined as P0. The balls 50 in the third section 413 are subjected to a same preload in an opposite direction to the first section, and the value of this preload is defined as −P0. The offset value in the second section 412 is an inclined straight line (FIG. 7B), which means the load applied to the balls 50 in the second section 412 also constantly changes (FIG. 7C). However, both the profiles of the cross-sections of the outer helical groove 31 and the inner helical groove 41 are in Gothic shape as shown in FIG. 6B, the value of the preload applied to the balls 50 in the second section 412 change from P0 to 0 constantly. Then, the value of the preload applied to the balls 50 in the second section 412 changes from 0 to −P0 constantly, and the touching point between the Gothic shape and the balls 50 changed to apply the reciprocal load in the axial coordinate direction. Simulation shows that there is a small area which the load applied to the balls 50 is zero in the second section 412, and there is no area where the slope is infinite (sharps change in load). In other words, the load applied to the balls 50 of the present invention won't encounter sharp change as the conventional ball screws do.

The constant second lead value L2 make offset value changes constantly in the second section 412, therefore, the load applied to the balls 50 may change directions, but won't encounter sharp change in value. The load applied to the balls 50 constantly and continuously changes when the nut 40 is not subjected to external load, namely, the differential of the curve that represents the relationship between the load applied to the balls 50 in the second section 412 and the helical angle of the screw is not infinite.

Referring still to FIG. 7C, when an external load F1 (not shown) is applied to the screw 30 in axial coordinate direction, the load exerted on the balls 50 will be increased in order to counteract the external load F1. At this moment, the load applied to the balls 50 in the first section 411 will be increased to a load P1, and the lead offset value δ in the second section does not change. As shown in FIG. 7C, the curve representing the load applied to the balls in the second section 412 is parallel and connected to the curve of P1, the load applied in positive direction to the balls 50 in the second section 412 is also increased, and the load applied in negative direction to the balls 50 in the second section 412 is decreased, as indicated by the dotted line in FIG. 7C.

Similarly, when the external load is applied to the screw 30 is increased to F2 which is larger than F1 (now shown) in axial coordinate direction, the load exerted on the balls 50 in the first section 411 will be increased to a load P2. As shown in FIG. 7C, the dashed line curve representing the load applied to the balls in the second section 412 is parallel and connected to the curve of P2. The load applied in positive direction to the balls 50 in the second section 412 is also increased, the load applied in negative direction to the balls 50 in the second section 412 is decreased, and the balls 50 in the second section 412 are fully subjected to loads in the positive direction, thus improving the load capacity of the ball screw in the positive direction. Besides, changing the external load applied to the screw 30 in the positive direction can adjust the status of the balls 50 being subjected to the load, consequently enhancing the applicability of the ball screw. When in use, the load applied to the balls 50 in the third section 413 is reduced to zero and therefore are fully subjected to loads in the positive direction. Similarly, when the nut 40 is subjected to an external load in a negative direction, the balls 50 in the second section 412 are also subjected to an external load in the negative direction. Namely, the balls 50 in the second section 412 can expand the loading area and are able to be subjected to loads in positive or negative direction for changing the direction of the external load, so that the load capacity of the ball screw of the present invention is improved with respect to the conventional ball screw.

It is to be noted that the offset value and preload changes constantly and smoothly in the second section 412 and the balls 50 in the second section 412 can be subjected to loads in positive or negative direction, so that the running smoothness, precision and load capacity of the ball screw of the present invention is enhanced.

While we have shown and described various embodiments in accordance with the present invention, it is clear to those skilled in the art that further embodiments may be made without departing from the scope of the present invention.

What is claimed is:

1. An offset preload ball screw with expandable loading area comprising:
    a screw with a length extending along an axis and including an outer helical groove on an outer surface thereof, wherein the outer helical groove of the screw is designed in a Gothic shape and has a constant screw lead value, a radius of the outer helical groove of the screw is defined as a first radius;
    a nut with a length extending along the axis and including an inner helical groove formed on an inner surface of the nut, the inner helical groove of the nut being designed in a Gothic shape, the nut being sleeved onto the screw, and between the outer and inner helical grooves being defined a loading path, the inner helical groove including at least a first section, a second section and a third section which are continuously connected one another, an amount of displacement along the axis for each additional 360 degrees of a helical angle of the first section being equal to a first lead value, an amount of displacement along the axis for each additional 360 degrees of a helical angle of the second section being equal to a second lead value, and an amount of displacement along the axis for each additional 360 degrees of a helical angle of the third section being equal to a third lead value, wherein the first and third lead values are equal to the screw lead value, and the first lead value is not equal to the second lead value; and
    a plurality of balls disposed in the loading path, wherein a radius of the respective balls is defined as a second radius, and the first radius is larger than 1.01 times the second radius;
    wherein a differential of a curve that represents a relationship between a load applied to the balls in the second section and a helical angle of the screw is not infinite.

2. An offset preload ball screw with expandable loading area comprising, a screw with a length extending along an axis and including an outer helical groove on an outer surface thereof, wherein the outer helical groove of the screw is designed in a Gothic shape and has a constant screw lead value, a radius of the outer helical groove of the screw is defined as a first radius;
    a nut with a length extending along the axis and including an inner helical groove formed on an inner surface of the nut, the inner helical groove of the nut being designed in a Gothic shape, the nut being sleeved onto the screw, and between the outer and inner helical grooves being defined a loading path, the inner helical groove including at least a first section, a second section and a third section which are continuously connected one another, an amount of displacement along the axis for each additional 360 degrees of a helical angle of the first section being equal to a first lead value, an amount of displacement along the axis for each additional 360 degrees of a helical angle of the second section being equal to a second lead value, and an amount of displacement along the axis for each additional 360 degrees of a helical angle of the third section being equal to a third lead value, wherein the first and third lead values are equal to the screw lead value, and the first lead value is not equal to the second lead value; and a plurality of balls disposed in the loading path, wherein a radius of the respective balls is defined as a second radius, and the first radius is larger than 1.01 times the second radius;

wherein the balls in the second section are subjected to a load which continuously changes, and a differential of a curve that represents a relationship between the load applied to the balls in the second section and a helical angle of the screw is not infinite.

3. The offset preload ball screw with expandable loading area as claimed in claim 1, wherein the balls in the second section are subjected to loads in both negative and positive directions when an external load applied to the nut is zero.

4. The offset preload ball screw with expandable loading area as claimed in claim 1, wherein there is an axial offset value between extension lines of the first and third sections along the X axis, and the axial offset value is defined as a lead offset value which is not equal to zero.

5. The offset preload ball screw with expandable loading area as claimed in claim 4, wherein the second section has a length extending along the axis, the lead offset value is equal to the value of W(L2−L1)/L2, and L1, L2 are the first and second lead values, and W is the length of the second section along the axis.

6. The offset preload ball screw with expandable loading area as claimed in claim 1, wherein the second section has a length along the axis, and the length of the second section is 0.5-2 times the second lead value.

7. The offset preload ball screw with expandable loading area as claimed in claim 1, wherein the change rate for offset value in the second section is constant with respect to a helical angle change in the second section.

8. The offset preload ball screw with expandable loading area as claimed in claim 1, wherein the balls in the second section are capable of expanding the loading area and are able to be subjected to loads in positive or negative direction for changing directions of an external load.

9. The offset preload ball screw with expandable loading area as claimed in claim 1, wherein the lead offset value is smaller than or equal to one percent of the first lead value.

* * * * *